Sept. 22, 1925.

D. A. RYAN 1,554,763

SPEED SIGNAL FOR AUTOMOBILES, ETC

Filed April 17, 1923

INVENTOR.
Daniel Arthur Ryan
BY
Fay, Oberlin & Fay
ATTORNEYS

Patented Sept. 22, 1925.

1,554,763

UNITED STATES PATENT OFFICE.

DANIEL ARTHUR RYAN, OF LAKEWOOD, OHIO.

SPEED SIGNAL FOR AUTOMOBILES, ETC.

Application filed April 17, 1923. Serial No. 632,661.

*To all whom it may concern:*

Be it known that I, DANIEL ARTHUR RYAN, a citizen of the United States, and a resident of Lakewood, county of Cuyahoga, and State of Ohio, have invented a new and useful Improvement in Speed Signals for Automobiles, Etc., of which the following is a specification, the principle of the invention being herein explained, and the best mode in which I have contemplated applying that principle so as to distinguish it from other inventions.

The present improvements relate more particularly to a speed indicating device that will warn the driven of an automobile or other vehicle whenever any given speed limit is reached. The signal thus given is preferably an audible one, the object being to relieve the driver from the necessity of watching a speedometer in order to make sure that he is keeping within the various rates of speed prescribed for different localities. A further object of the invention is to provide a device of this character that will be simple and compact and that may be, in effect, attached to a speedometer such as is usually found mounted on the dashboard of automobile vehicles. A further object is to provide a signal device that will notify the driver when a predetermined speed is reached, but will not necessarily continue to signal if such speed is passed.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1:
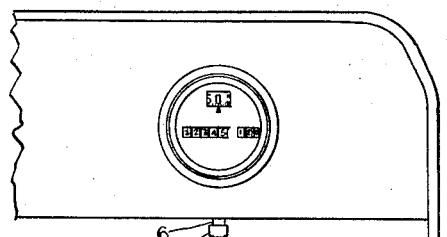
Figure 2:
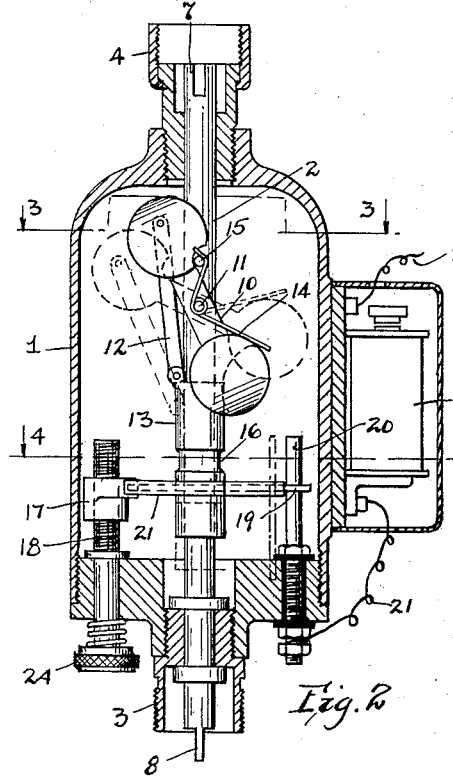
Figure 3:
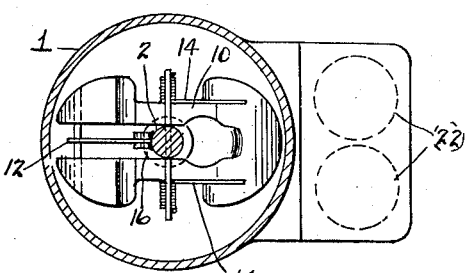
Figure 4:
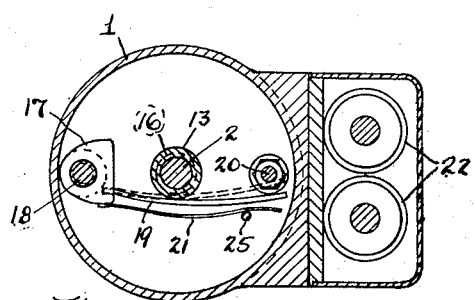

Fig. 1 is a broken elevational view of the instrument board of an automobile showing a speedometer mounted therein in the usual fashion and also showing my improved signal device attached to such speedometer; Fig. 2 is a central vertical section of such device; and Figs. 3 and 4 are transverse sections thereof taken on the plane indicated by the lines 3—3 and 4—4, respectively, Fig. 2.

The two main elements of the device comprise a shell or housing 1, which is preferably of general cylindrical form, and a short shaft or spindle 2 axially disposed within said housing and being suitably journaled in the respective ends of the latter. Such casing ends are provided with a male coupling 3 and a female coupling 4, respectively, whereby, upon disconnecting from the speedometer the flexible driving shaft 4 therefor, and its casing 5, said housing 1 may be attached at its one end to the appropriate portion 6 of said speedometer, and the disconnected end of said casing 5 attached in turn to the other end of said housing. The corresponding ends 7 and 8 of the spindle 2 within said housing, as clearly shown in Fig. 2, are formed for driving engagement within the speedometer spindle, (not shown) and the disconnected end of flexible shaft 4 when the housing 1 is thus interposed. As a result said spindle, it will be seen, constitutes in effect a continuation of the flexible shaft 4 whereby the speedometer is driven.

The spindle 2 is provided with a centrifugally controlled member, preferably consisting of a bar 10 pivotally attached to said spindle about a traverse axis 11 and weighted at its respective ends, which bar is connected, by means of a link 12, with a sleeve or collar 13 longitudinally slidable on the spindle. Two wire springs 14, coiled about the opposite projecting ends of the pin 11 that forms the axis of said arm 10, and each having one end in engagement with a fixed pin 15 on the spindle and the other with the opposite end of said arm, serves normally to retain the latter in the position shown in full lines in Fig. 3. However, upon rotation of the spindle centrifugal force will tend to move said arm from such normal position into an approximately horizontal position so that for any given speed said arm will lie in corresponding angular relation to the spindle and the sleeve or collar 13 will be correspondingly displaced.

Said sleeve, it will be noted, is provided with an encircling groove 16, and disposed transversely of such sleeve, being supported by means of a nut member 17 on an adjusting screw 18 rotatably mounted in the lower end of housing 1, is a contact arm 19 that, when it lies in such groove, will press against a binding post 20 likewise mounted in such lower end of housing 1. A leaf spring 21, attached at one end to said nut 17 and held at its other end behind a post 25, tends thus to force said contact member against post 20, but the diameter of sleeve 13, except for the grooved portion thereof, is such as to prevent contact being thus made.

The post 20, as shown in Fig. 2, is insulated from the housing and has its outer end connected, by means of an insulated wire 21 or otherwise, with a small electrical buzzer 22 of familiar construction that is attached to one side of the housing 1. Said housing is grounded and the other lead 23 from the buzzer is connected with the appropriate side of the battery circuit so that the effect of bringing member 19 into contact with post 20 will be to close such circuit through the buzzer and so cause the latter to give an audible signal, which will begin and continue as long as the groove 16 in sleeve 13 is positioned adjacent to said member 19. The lower projecting end of screw 18 is provided with a knurled head 24 whereby such screw may be readily rotated and the nut 17, that carries said contact member 19, thus shifted longitudinally of spindle 2 so that the groove 16 in sleeve 13 will thus cause the circuit to be closed when said sleeve is correspondingly displaced from its normal position, or, in other words, when the spindle 2 is rotating at any given speed.

From the foregoing description of the construction of my improved signal device its operation and method of use should be readily apparent. In the first place, it will be noted that the device can be almost instantly attached to an automobile, the only tools required being a wrench or pincers. The connection of the buzzer in the electrical circuit is also such that any amateur can make. When installed, the position of contact member 19 is adjusted by direct reference to the speedometer. In other words, if it is desired to have the device signal the driver when a speed of twenty miles is reached, the car is run at that speed, and nut 24 turned in one direction or the other so that the circuit through the buzzer is closed. Thereafter, whenever the speed in question is reached, the buzzer will sound a signal and so warn the driver without any attention being required to the speedometer. In ordinary driving it is frequently desirable to exceed for a short distance the prescribed speed, as in passing another vehicle, and in such case the buzzer, after giving an initial signal, will not continue to sound, inasmuch as the further movement of sleeve 13 will force member 19 again out of contact with post 20.

Other modes of applying the principle of my invention may be employed instead of the one explained, change being made as regards the mechanism herein disclosed, provided the means stated by any of the following claims or the equivalent of such stated means be employed.

I therefore particularly point out and distincly claim as my invention:—

1. In a signal device of the character described, the combination of a housing, a spindle rotative within said housing, a centrifugally actuated member carried by said spindle, a sleeve longitudinally movable along said spindle and operatively connected with said member, a contact post and a movable contact member forming part of an electric circuit, and a spring pressing said contact member against said sleeve and towards said post, said sleeve being formed to permit contact between said member and post only in a certain position of said sleeve longitudinally of said spindle.

2. In a signal device of the character described, the combination of a housing, a spindle rotative within said housing, a centrifugally actuated member carried by said spindle, a sleeve longitudinally movable along said spindle and operatively connected with said member, a contact post and a movable contact member forming part of an electric circuit, and a spring pressing said contact member against said sleeve and towards said post, said sleeve being formed to permit contact between said member and post only in a certain position of said sleeve longitudinally of said spindle, and said member being adjustable in a direction parallel with said shaft.

3. In a signal device of the character described, the combination of a housing, a spindle rotative within said housing, a centrifugally actuated member carried by said spindle, a sleeve longitudinally movable along said spindle and operatively connected with said member, a contact post and a movable contact member forming part of an electric circuit, a screw rotatably mounted in said casing and lying parallel with said spindle, a nut on said screw carrying said contact member, and a spring pressing said contact member against said sleeve and towards said post, said sleeve being formed to permit contact between said member and post only in a certain position of said sleeve longitudinally of said spindle.

Signed by me, this 13 day of April, 1923.

DANIEL ARTHUR RYAN.